(12) United States Patent
Gottlieb et al.

(10) Patent No.: US 8,321,258 B2
(45) Date of Patent: Nov. 27, 2012

(54) VEHICLE SCHEDULING AND ROUTING WITH COMPARTMENTS

(75) Inventors: Jens Gottlieb, Schwetzingen (DE);
Jochen Christoph Eckert, Mühlhausen (DE); Thomas Engelmann, Walldorf (DE); Carsten Schumm, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 1321 days.

(21) Appl. No.: 11/515,111

(22) Filed: Aug. 31, 2006

(65) Prior Publication Data
US 2008/0065262 A1 Mar. 13, 2008

(51) Int. Cl.
*G06Q 10/00* (2006.01)

(52) U.S. Cl. ............ 705/7.26; 340/4.6; 340/568.1; 340/666; 340/673; 705/5; 705/6; 705/7.34; 705/7.35; 705/7.36; 700/90; 700/213

(58) Field of Classification Search ........ 340/568.1, 340/673, 5.9, 5.92, 666; 705/8, 9, 28, 29, 705/64, 26, 6, 1.1, 5, 7.11, 7.12, 7.22, 7.23, 705/7.26, 7.34, 7.35; 701/49; 180/271; 700/226, 700/90, 213; 414/800; 709/213; 235/384; 220/23.9, 23.91, 500
See application file for complete search history.

(56) References Cited

U.S. PATENT DOCUMENTS

| | | | | |
|---|---|---|---|---|
| 4,880,342 A * | 11/1989 | Pradovic | | 410/121 |
| 5,054,295 A * | 10/1991 | Goulooze | | 62/239 |
| 5,265,006 A * | 11/1993 | Asthana et al. | | 705/8 |
| 5,758,329 A * | 5/1998 | Wojcik et al. | | 705/28 |
| 5,835,716 A * | 11/1998 | Hunt et al. | | 709/213 |
| 6,332,098 B2 * | 12/2001 | Ross et al. | | 700/226 |
| 6,406,249 B1 * | 6/2002 | McAdams et al. | | 414/800 |
| 6,606,875 B1 * | 8/2003 | Grand et al. | | 62/239 |
| 6,678,576 B2 * | 1/2004 | Kiyohara et al. | | 700/213 |
| 2004/0035631 A1 * | 2/2004 | Schlecht et al. | | 180/271 |
| 2006/0089863 A1 * | 4/2006 | Belleau et al. | | 705/6 |
| 2006/0200333 A1 * | 9/2006 | Dalal et al. | | 703/17 |
| 2006/0265234 A1 * | 11/2006 | Peterkofsky et al. | | 705/1 |
| 2007/0265754 A1 * | 11/2007 | Curtis et al. | | 701/49 |

OTHER PUBLICATIONS

Emmanuel D. Chajakis et al., Scheduling Deliveries in Vehicles with Multiple Compartments, 2003, Kluwer Academic Publishers, Journal of Global Optimization 26:43-78, 2003.*

* cited by examiner

*Primary Examiner* — George Bugg
*Assistant Examiner* — Sisay Yacob
(74) *Attorney, Agent, or Firm* — Blakely, Sokoloff, Taylor & Zafman LLP

(57) ABSTRACT

Embodiments of the invention include a system for scheduling the shipment of a set of products. The shipment may be loaded into a set of vehicles and further configured to fit a set of compartments on those vehicles. The system may include attempts to fill each vehicle and the compartments of each vehicle. The system may include evaluating a set of constraints on the shipment. The constraints may include a complex logical statement.

30 Claims, 7 Drawing Sheets

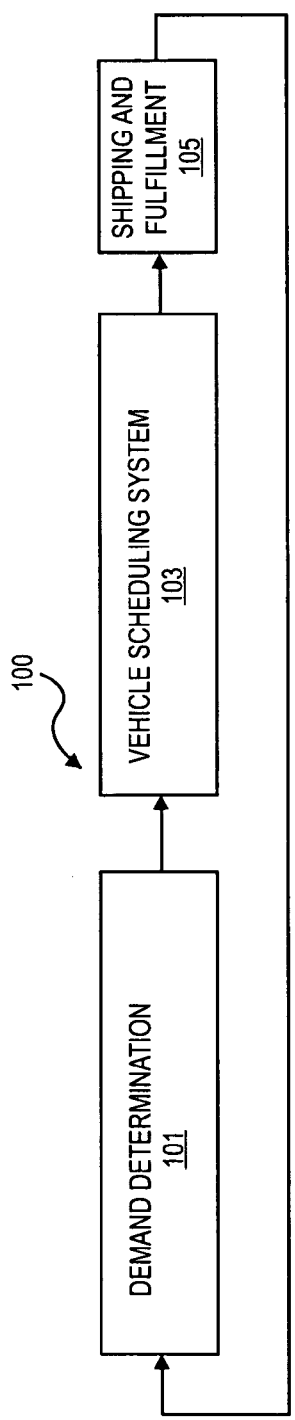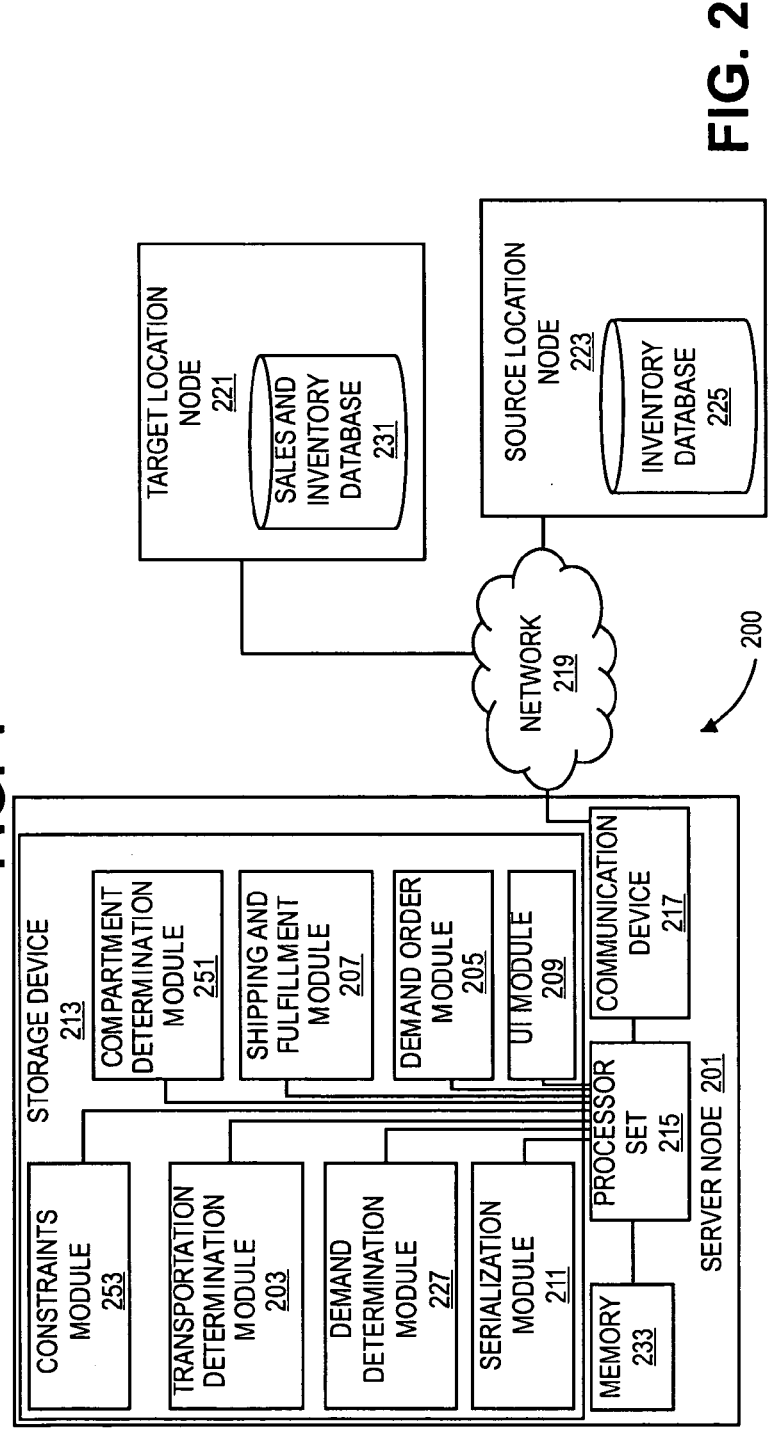

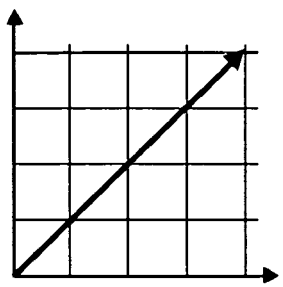
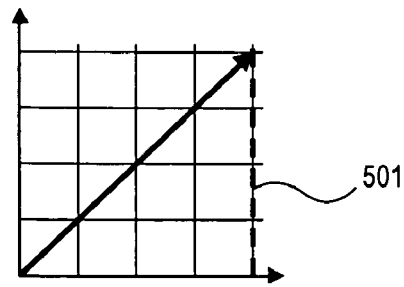
FIG. 5A    FIG. 5B
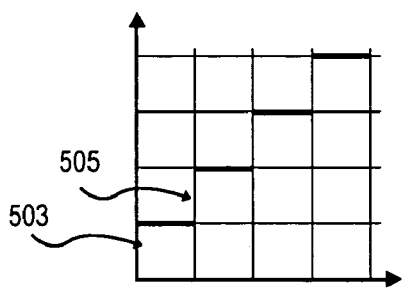
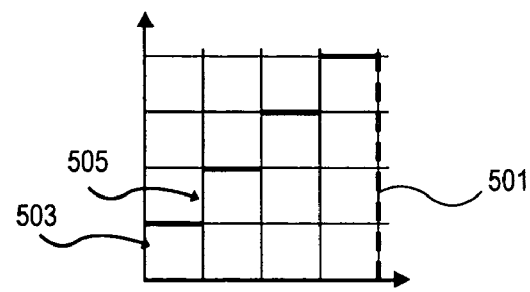
FIG. 5C    FIG. 5D
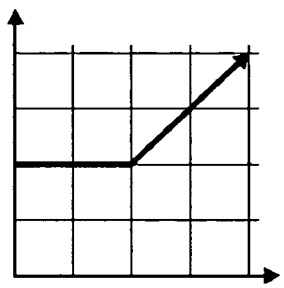
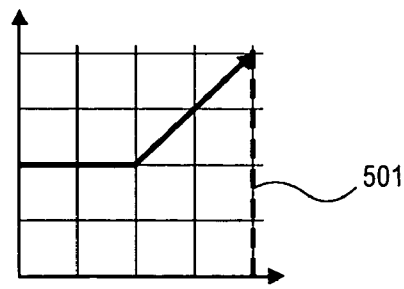
FIG. 5E    FIG. 5F
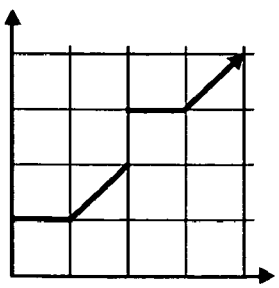
FIG. 5G

VEHICLE SCHEDULING AND ROUTING WITH COMPARTMENTS

BACKGROUND

1. Field of the Invention

The invention relates to logistics and supply chain management. Specifically, the invention relates to scheduling loads for vehicles with compartments to fulfill the demand of target locations.

2. Background

Logistics often involves the transportation of goods and services from a source location to a destination location. The transportation services for this movement of goods and services may be provided by transportation services providers (e.g., DHL or UPS), a manufacturer, retailer, distributor or similar entity. The transportation of goods and services is often employed in the process of supply chain management.

A supply chain is a network of retailers, distributors, transportation service providers, warehouses, and suppliers that take part in the production, delivery and sale of a product or service. Supply chain management is the process of coordinating the movement of the product or service, information related to the product or service, and money among the constituent parts of a supply chain. Supply chain management also integrates and manages key processes along the supply chain. Supply chain management strategies often involve the use of software to project and fulfill demand and improve production levels.

Logistics is a subset of the activities involved in supply chain management. Logistics includes the planning, implementation and control of the movement and storage of goods, services or related information. Logistics aims to create an effective and efficient flow and storage of goods, services and related information from a source to the target location where the product or source is to be shipped to meet the demands of customers.

The movement of goods and services through a supply chain often involves the shipment of the goods and services between the source location at which the product is produced or stored and the target location where the product is to be shipped such as the wholesaler, vendor or retailer. The shipment of products involves a vehicle such as a truck, ship, train or airplane and involves the planning of the arrangement of the products to be shipped in the vehicle.

The shipment of goods may involve complex constraints. Supply chain management systems are limited in their ability to simulate the loading of a vehicle while ensuring adherence to a complex set of constraints. For example, supply chain management systems are unable to maximize the use of vehicles, especially vehicles with multiple compartments.

SUMMARY

Embodiments of the invention include a system for scheduling goods for a set of vehicles for shipment. The scheduling system may include a compartment scheduling module. The compartment scheduling module may be used to determine which compartments of a vehicle a good may be scheduled to. This scheduling may include evaluating a set of constraints on the shipment. The constraints may include a complex logical statement and be based on the requirements of the routing, goods, compartment and vehicle.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

FIG. 1 is a diagram of one embodiment of an order replenishment management system.

FIG. 2 is a diagram of one embodiment of a vehicle scheduling system for vehicles with compartments.

FIGS. 5(A)-(G) are diagrams of example functions for compartment utilization.

DETAILED DESCRIPTION

Figure 3A:
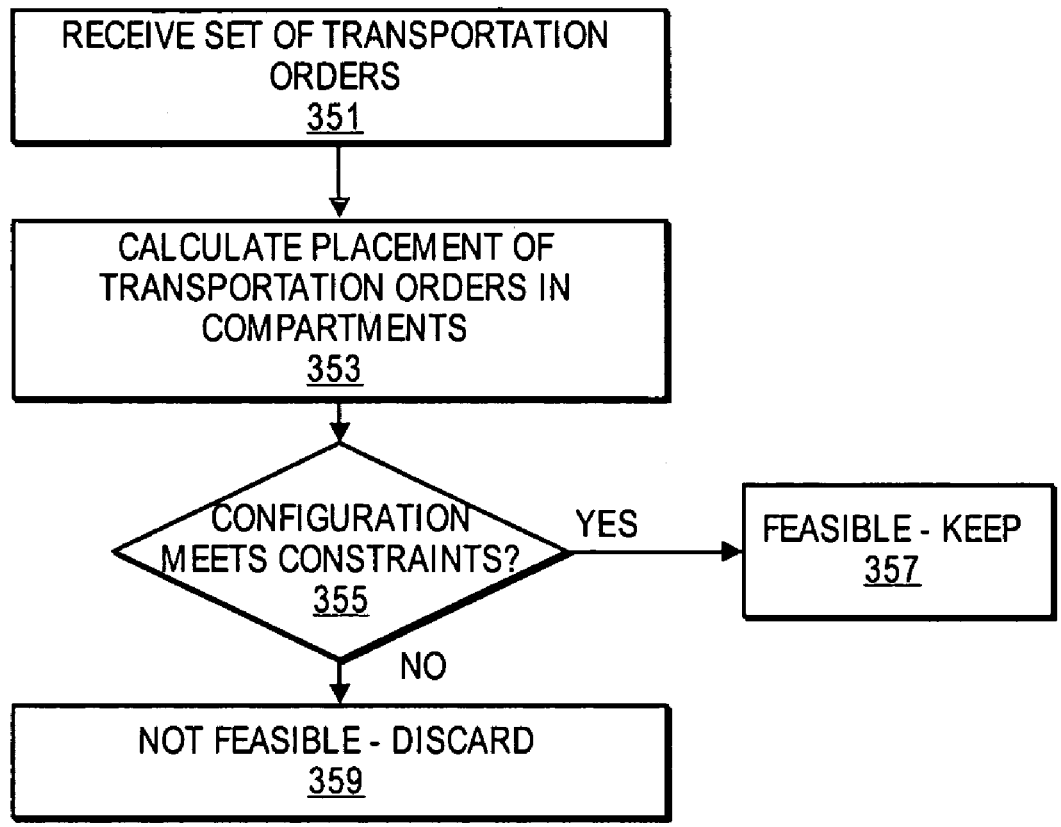
FIG. 3 is a flowchart of one embodiment of an assignment process of a compartment determination module.

FIG. 1 is a diagram of an order replenishment management system. Order replenishment system 100 may be utilized in a supply chain to manage the movement of goods between source locations and target locations. A source location may be any location in a supply chain that may provide a product or similar items. A target location may be any location in a supply chain that may receive a product or similar items. A single location may be both a source and target location dependent upon the context. For example a factory may be a source location that ships products to a warehouse or similar location. The same factory may be a target location for receiving component parts for a product assembled at the factory. Similarly, other locations including warehouses, distribution centers, retailers and similar locations may be either a source or target location dependent on the shipping context. The embodiments discussed herein primarily use an example where a factory or warehouse is the source location and the end user or retailer is the target location for sake of clarity. One skilled in the art would understand these are examples of target and source locations and other target and source locations may be used.

In one embodiment, an order replenishment management system 100 may receive sales data, inventory data from retailers, inventory data from warehouses or similar demand data. Order replenishment management system 100 may then generate orders for shipments of products from source locations like factories and distribution centers to meet the demand generated by customers or end users. In one embodiment, order replenishment management system 100 receives sales, inventory or similar demand data from a set of retailers, warehouses and similar sources (block 101). The demand data may be received at regular intervals (e.g., days, months and similar time intervals).

The demand data that is received from the retailers, warehouses and similar sources is processed to predict the future or current demand for a set of products. As used herein the term "set" may include any number of items including a single item. The projected demand for a set of products may be for any time period (e.g., a month, week, day, hour or similar measurement of time). The projected demand may also include a prediction of demand for subdivisions of the time period of the projection. For example, a projection of demand for a month may have a breakdown of that demand on a day by day or week by week basis.

The projected demand data may be used by a vehicle scheduling system to determine the best manner of transporting a set of products to a target location (block 103). The determination of a route for sending products to the target location may involve the analysis of the availability of demanded products at various source locations, the cost of shipping the products from the source locations to the target locations, the utilization of the capacity of a vehicle for shipping the products from the source location to the target location and the types and capacity of the compartments of the vehicle.

The determination of the vehicle schedule may include a simulation of building a load (e.g., a shipment of products) in a vehicle. The building of a load may involve consideration of the size, weight, product types and similar characteristics of a shipment. The loading of the shipment into a vehicle may be required to meet a set of constraints. For example, the vehicle may have a weight limit and a volume limit, certain products may not be properly shipped in the same vehicle as other products and similar shipping constraints may be a part of the loading simulation. This simulated load may also be applied to compartments within a vehicle. Each compartment may have weight, volume, pallet limits or similar capacity limits. Some compartments and vehicles may have restrictions on the type of products that can be shipped within them (e.g., freezer compartments may not store items that cannot withstand cold temperatures). Further restrictions may include the incompatibility of certain products with one another such that they cannot be shipped in the same compartment or vehicle. Any combination of constraints may be considered in determining a load for a shipment or compartment.

The vehicle scheduling generates a set of transportation orders. Each transportation order indicates a set of goods to be transported from a source location to a target location. Each transportation order may be assigned to a specific vehicle or a set of vehicles by a transportation determination module. The transportation order may be further assigned to a compartment of a vehicle or across multiple compartments of a vehicle. The assignment of products to compartments may be represented as a compartment configuration data structure. A transportation plan may include a set of transportation orders assigned to vehicles, routing stops for a vehicle, a route schedule with start and end times for activities (e.g., deliver, rest or similar activities) and similar information.

After the transportation orders for shipping the products are determined, fulfillment instructions may be sent out to the origination site (block 105). The shipping and fulfillment instructions may be sent electronically to the source location. In one embodiment, the loading simulation and transportation orders are determined at a central server node. The shipping and fulfillment instructions or the vehicle schedules, transportation orders or compartment configuration data structures themselves may be sent to a remote node at the source location through a network or similar communication system.

FIG. 2 is a diagram of one embodiment of a vehicle scheduling system for vehicles with compartments. In one embodiment, the scheduling system 200 may include a server node 201, target location node 221 and source location node 223. Server node 201 may be a single central server, a set of servers sharing the scheduling tasks or similar system. The scheduling system 200 may include multiple target location nodes 221 or multiple source location nodes 223.

In one embodiment, target location node 221 may include a sales or inventory database 231. The sales database 231 tracks the sales of a retailer, vendor, warehouse or similar source of demand. The inventory database 231 tracks the inventory levels of the products supplied by the scheduling system 200. Target location node 221 may be in communication with server node 201 through a network 219, point to point link or similar communication systems.

In one embodiment, source location node 223 may include an inventory database 225. The inventory database 225 tracks the inventory levels of the products to be supplied by the scheduling system 200. Source location node 223 may be in communication with server node 201 through a network 219, point to point link or similar communication systems.

In one embodiment, server node 201 may include a communication device 217 to receive demand data including sales data or inventory data from the target location node 221 through network 219 or similar communications system. Communication device 217 may be a modem, network card or similar communications device.

In one embodiment, the incoming sales and inventory data may be processed by a demand determination module 227. Demand determination module 227 may utilize the data supplied by target location node 221 to generate a set of demand orders that may be stored in a demand order module 205. In one embodiment, incoming demand data may include various types of data, such as demand related to special promotions, demand for common product restocking or similar data. Demand determination module 227 or similar module may adjust, filter or sort data according to type to prevent skewed demand orders or generate demand orders for a specific type of product demand. The demand determination module 227 may be a component of a demand determination system that includes demand projection and similar functionality. In another embodiment, demand determination is a separate system from the vehicle scheduling system.

In one embodiment, demand order module 205 may be a data structure that stores and tracks a set of products for which demand has been predicted by demand determination module 227. For example, demand determination module 227 may determine that one hundred units of a product should be shipped to a destination (e.g., a retailer, warehouse or similar destination) each week and that fifty of the product units should be shipped on a Monday and ten units should be shipped Tuesday through Saturday to meet the projected demand.

In one embodiment, transportation determination module 203 may be an application that schedules the loading of a set of vehicles with a shipment of products (e.g., generates transportation orders) based on demand data from a demand order module. For example, a transportation determination module 203 may be used to determine how the fifty units of the Monday shipment will be scheduled onto a set of vehicles. In one embodiment, transportation determination module 203 may work in conjunction with or call on the services of a compartment determination module 251. Compartment determination module 251 may determine whether a set of products of a transportation order tentatively assigned to a vehicle can be loaded into the compartments of the vehicle while meeting the constraints of these compartments and the products in the transportation order. The transportation determination module 203 and compartment determination module 251 may be utilized in conjunction with any type of vehicle (e.g., a ship, airplane, truck, train or similar vehicle) or object that moves or is capable of being moved and the compartments of such vehicles and objects.

In one embodiment, transportation determination module 203 may work in connection with a constraints module 253 when determining the loading of the set of vehicles. Constraints module 253 may be a data structure that includes a set of shipping rules or other constraints on the shipping of products using a set of vehicles. Shipping rules and constraints may include limitations on the combinations of certain products in a single transport, weight limitations of a transport, size of a transport, default shipment configurations, number of transportation orders per transport, combination of demand orders or products from different sources and similar data. Similarly, compartment determination module 251 may utilize the constraints module 253 to determine constraints applicable to compartments and apply these constraints to product configurations for the compartments. In addition some constraints may be specific to compartments, such as compartment type, number of transportation orders per compartment, combination of products, demand orders or products from a particular source in a compartment and similar constraints.

In one embodiment, the transportation determination module 203 and compartment determination module 251 may attempt to create "full" loads by maximizing the utilization of the capacity of a set of vehicles and each compartment in each vehicle used for shipping. Maximizing the utilization of a set of vehicles and their compartments can reduce the per item or unit shipping costs. Maximum utilization may be measured in any appropriate manner such as the number of shipping units or pallets that a vehicle or compartment may carry, the weight limit a vehicle or compartment may carry, the volume of goods that a vehicle or compartment may carry or by use of similar criteria. Maximum utilization may mean that the carrying capacity is used to its fullest extent (e.g., it has met its weight limit or its volume limit or shipping limit) or falls within an acceptable range (e.g., ±1000 pounds of the vehicle or compartment weight limit). This range may be defined to suit the needs of the order replenishment system or user. The range of acceptable "full" loads may be characterized as having a maximum bound and minimum bound.

In one embodiment, the transportation determination module 203 and compartment determination module 251 may not fill all of the vehicles to a maximum capacity for technical, business, logistical or similar reasons. A false or temporary maximum capacity may be used in place of an actual maximum capacity. In one embodiment, the false maximum capacity may be used as a default loading goal. Transportation determination module 203 and compartment determination module 251 may load some of the vehicles or compartments only up to the false maximum capacity to leave room on a transport to accommodate a product that may be added at a later date or stop, leave room to maneuver products during unloading or for similar reasons. The number of vehicles which are filled up to the false maximum capacity may be kept at a minimum. Similar alterations and accommodations may also be implemented to the capacity characteristics of vehicles and compartments.

In one embodiment, the compartment determination module 251 may be separate from the transportation determination module 203 to facilitate the addition of the compartment determination module 251 to existing vehicle scheduling systems that do not support compartment determination. Minimal changes to these systems may be required as the compartment determination module 251 may operate largely transparently to the other modules by creating a compartment configuration data structure without disturbing other data structures. In one example, the transportation determination module 203 may be modified to call the compartment determination module 251 to filter out infeasible transportation orders, which may then be excluded from transportation plans. In another embodiment, the transportation determination module 203 may be integrated with the compartment determination module 251.

When the desired load configuration has been determined by the transportation determination module 203 the results may be sent to a shipping and fulfillment module 207. Shipping and fulfillment module 207 may generate a formatted set of loading configurations or instructions. Shipment and fulfillment module 207 may then output the loading configurations and instructions in the form of a load order or similarly formatted data or modules to source location node 223. In one embodiment, the load configuration instructions may be saved in the form of a compartment configuration data structure. This module may be a formatted file or data structure indicating the organization of transportation orders and products amongst a set of vehicles and compartments. The shipment instructions may be sent through a communication device 217 over a network 219 or similar communications system. Source location node 223 may be located at a source location such as a factory, warehouse or similar product source location.

In one embodiment, the vehicle scheduling system 200 may include a user interface module 209. The user interface module 209 may provide an interface for a user such as an administrator or other user (e.g., a transportation planner or similar user) to view transportation orders, transportations plans, compartment configuration data structures and similar data. The user interface may also allow editing of these data structures and the setting of related characteristics, constraints and similar data.

In one embodiment, the vehicle scheduling system 200 may include a serialization module 211. The serialization module 211 may transform a transportation plan or set of transportation orders into a format where they can be analyzed by the compartment determination module 251. The compartment determination module 251 may process transportation orders one at a time as it determines the assignment of transportation orders to a compartments using a compartment configuration data structure. The serialization module 211 may be used to provide transportation orders to the compartment determination module 251 one at a time from an already created transportation plan or a set of transportation orders.

In one embodiment, the modules of vehicle scheduling system 200 are a set of software instructions, data structures, electronic devices or similar implementations. In one embodiment, the data structures and instructions may be constructed using an object oriented paradigm or similar implementation. In one embodiment, the instructions and data structures are stored on a storage device 213. The instructions may be executed or the data structures loaded by a set of processors 215. The set of processors may utilize a system memory 233.

FIG. 3A is a flowchart of one embodiment of a process of a compartment determination module. The assignment of transportation orders to a compartment involves an optimization problem. Any type of optimization algorithm may be utilized in solving this optimization problem. For example, a local search, a tabu search, simulated annealing, evolutionary algorithms or other metaheuristics may be used. Also, mixed integer linear programming, constraint programming and other exact techniques or derived methods that may involve backtracking may be employed.

The flowchart sets forth the general functions that a compartment determination module may employ. The compartment determination module may receive a set of transportation orders from a transportation determination module (block 351). The compartment determination module acts as a filter to test and discard configurations of the products based on the transportation orders that are not feasible. The compartment determination module determines a placement or configuration of all items from the transportation orders (block 353). The compartment determination module then determines if these configurations meet the constraints on the vehicle, products, compartments and similar constraints (block 355). If the configurations do not meet the constraints they may be discarded (block 357). If the configurations do meet the constraints then they may be kept (block 359). The valid configurations may then be analyzed to determine an optimum configuration.

Figure 3B:
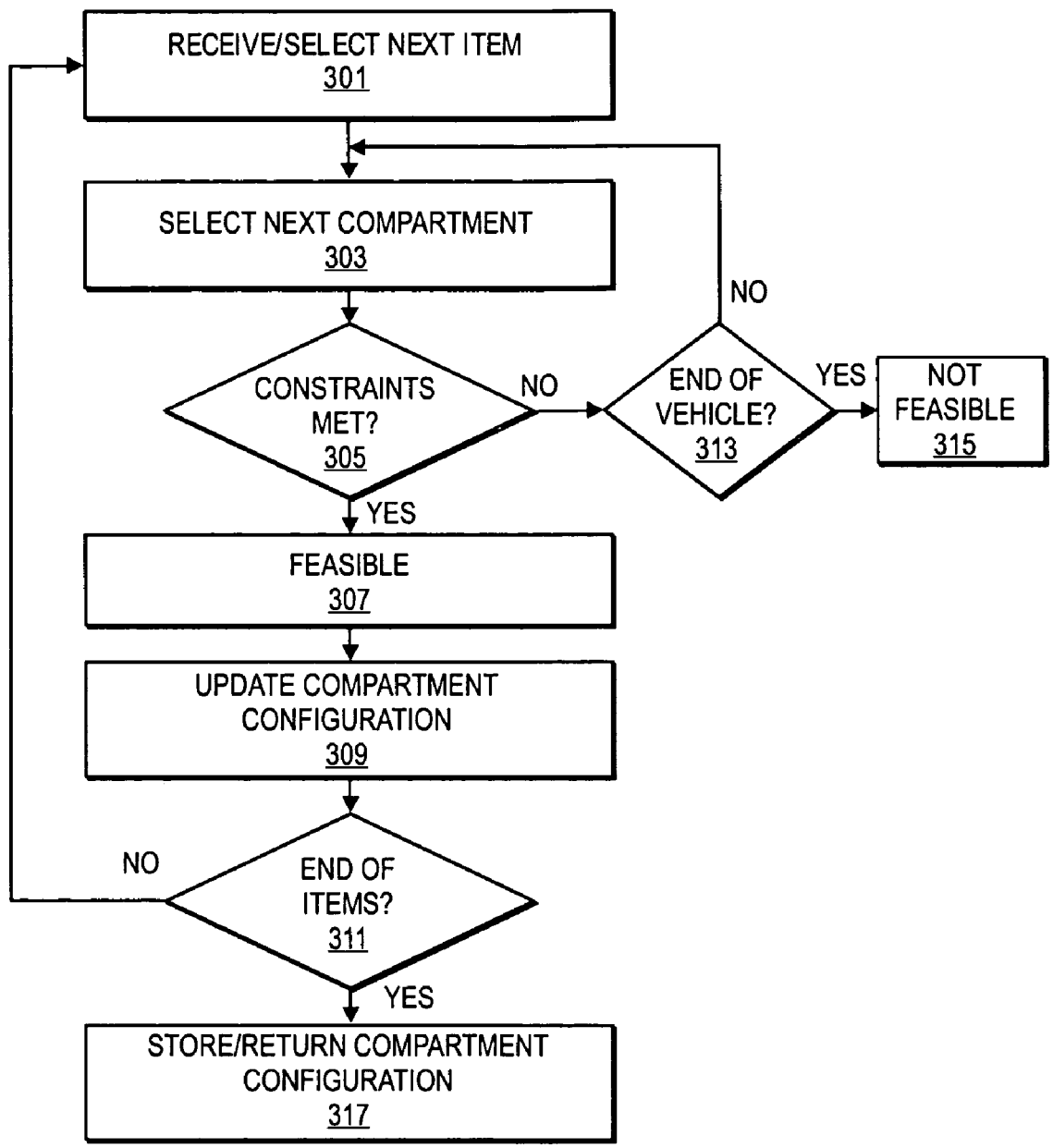

FIG. 3B is a flowchart of one example embodiment of a process of a compartment determination module. In one embodiment, the process may be initiated by a transportation determination module that calls the compartment determination module. The transportation determination module may provide a transportation order, set of transportation orders, a product or set of products that are to be placed on a vehicle (block 301). The compartment determination module determines whether products in the transportation orders or separate products may be assigned to a compartment of a vehicle. The transportation determination module can use this information to determine the best scheduling of all transportation orders to available vehicles by filtering out transportation orders that require configurations that are not feasible because of incompatibilities related to the compartment configuration of the vehicles.

In one embodiment, the compartment determination process is incremental and handles a single addition or a set of additions prior to placing a subsequent product or set of products. This embodiment may be referred to as a 'greedy' algorithm that assigns products to the first available space found. This algorithm may be most efficient in scenarios where there are not large numbers of restrictions on products, vehicles and compartments. In these scenarios other algorithms may be more efficient including local search algorithms or similar algorithms. In other embodiments, other types of algorithms and process may be used. This implementation is provided by way of example. One skilled in the art would understand that other implementations are within the scope of the contemplated invention.

In one embodiment, the process selects a first compartment of a vehicle that the transportation order has been assigned to (block 303). In one embodiment, the process may start with an empty compartment, vehicle and plan. The process may try each compartment in any order, for example the process may proceed from the back to the front of the vehicle, front to back, side to side, in order of descending size or similar order. In another embodiment, the compartment may be selected from a group of compartments that are distributed across multiple vehicles, vehicles and trailers or additional structures. A transportation order may be split across any number of compartments. The selection of a compartment may be set in a preferred order, based on type of compartment, based on size of compartment or similarly ordered. The order or criteria for determining order may be set by a user, administrator or similar entity. The received transportation orders may have been processed for cost efficiency at the vehicle level prior to testing at the compartment level.

Figure 4:
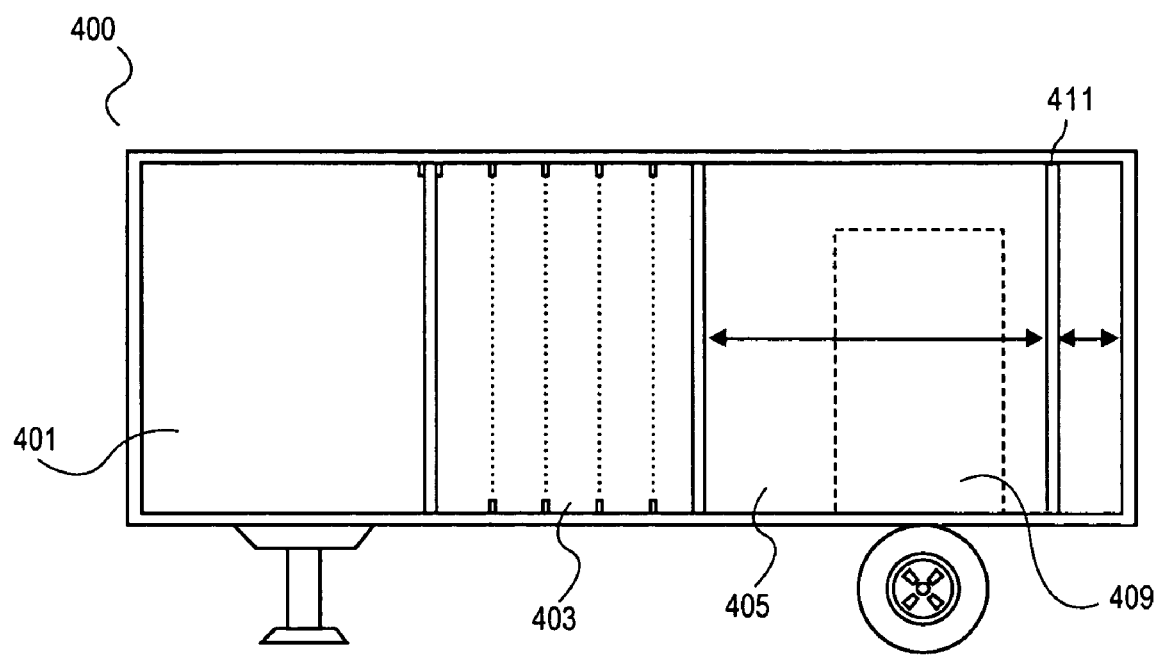
FIG. 4 is a diagram of one example embodiment of a compartmentalized vehicle.

FIG. 4 is a diagram of one example embodiment of a set of compartments associated with a vehicle. In the example, the vehicle 400 has at least three compartments 401, 403 and 405 dependent on configuration. Each compartment may be of the same or different type. For example, a compartment may be temperature controlled, airtight, weatherproof, or have similar characteristics. The first compartment 401 may be a fixed compartment. The fixed compartment has a fixed capacity in terms of size, number of pallets it can accommodate, maximum weight, dimensions and similar measures of capacity. The entire compartment may be utilized for placing products. If, however, less than the full size of a compartment is used then vehicle capacity cannot be maximized. In other words, the capacity of the vehicle is consumed by a fixed amount.

In the example, the middle compartment 403 has a variable size with fixed or defined increments. This type of compartment may be referred to as a fixed increment adjustable compartment. The size and dimensions of the compartment may be adjusted by moving at least one wall of the compartment. The wall may be positioned only at set places that may be uniform or non-uniform in spacing. In one embodiment, a single wall of a compartment may be moved over fixed increments. In another embodiment, multiple walls of the compartment may be adjusted. If less than the maximum size of the compartment is required to store products, then the size of the compartment may be reduced to conserve the capacity of the vehicle and make that capacity available in other compartments. However, the capacity of the compartment can only be reduced based on fixed increments. As a result, some capacity may be left unused. For example, if one wall can be adjusted in five foot increments with a minimum length of five feet and a single product six feet in length is placed in the compartment, then four feet of compartment may go unused. A fixed increment adjustment compartment may also be enlarged by fixed increments dependent on the overall capacity of the vehicle and other compartments and availability of positioning attachments.

The fixed increment adjustment compartment may have any capacity including any size or dimension. The fixed increment adjustment dimension may be any size and any number of adjustment positions may be provided. Any number of walls may be adjusted. A fixed increment adjustment compartment may have any position in a vehicle and have any compartment characteristic (e.g., a freezer compartment, airtight compartment or similar characteristic).

In the example, the third compartment 405 is a variable size compartment. This compartment is similar to the second compartment 403, but does not have fixed adjustment increments. Thus, this compartment can be adjusted to approximately the size of its contents dependent on the shape and placement of the contents. A single wall 411 may be adjustable or any number of walls may be adjustable. The variable sized compartment 405 may have any position in a vehicle and have any characteristic (e.g., a freezer compartment, airtight compartment or similar characteristic).

In one embodiment, a vehicle may have restrictions on the placement of variable adjustment and fixed adjustment compartments. For example, a side door 409 or similar structure may prevent a wall 411 from being placed in certain positions in the vehicle. A fixed adjustment compartment or variable adjustment compartment may encompass such restrictions (e.g., include a side door), but will have certain positions or capacity ranges that are not available.

As discussed above, compartments may have defining characteristics, such as temperature control, weatherproofing, airtight and similar characteristics. These characteristics may define categories of compartments, such as freezer compartments, gas tanks and similar categories of compartments. Products have similar defining characteristics such as temperature needs, gaseous, liquid, types of containers and similar characteristics. These characteristics may define categories of products, such as fuels, frozen items and similar categories. As is discussed further below these categories may be used to determine the compatibility of products and compartments.

Returning to a discussion of FIG. 3, the selection of a compartment may also include the adjustment of a capacity of a compartment. For example, if a previous check indicated it was not feasible to put an item in a first compartment and the compartment has an adjustable capacity, then the capacity of the compartment may be expanded and the check for feasibility run again. If the compartment has a fixed adjustment size then the next larger size may be checked. If the compartment has a variable size then the compartment may be increased in capacity based on the size of the product to be placed in it. The capacity adjustment may also take into account restrictions on the placement of walls and the overall capacity of the vehicle.

FIGS. 5(A)-(G) are diagrams of example functions of the change of occupied capacity of a vehicle over the process of placing products in the compartment. In each figure, the x-axis is the increase in placed products (load) in a compartment. The y-axis is the amount of capacity occupied in the vehicle.

In FIG. 5(A) a function for a standard compartment is depicted. The occupied capacity of the vehicle increases over each iteration of the process. This function assumes an infinite capacity for the compartment. There are no restrictions on the compartment, thus the occupation of the capacity of the vehicle may be based on the volume, weight, number of products, number of pallets or similar measurement of occupied capacity for the vehicle. This utilization may be expressed by the $f(x)=x$, where x represents the consumed capacity of a vehicle. FIG. 5(B) is a diagram for a standard compartment of a finite size. This example is similar to the previous standard vehicle figure, except that an upper bound 501 is present that restricts the increase in occupied capacity at a maximum capacity for the vehicle or compartment. This utilization may be expressed as $f(x)=x$ for $x<=u$, where u is the upper bound.

FIG. 5(C) is a diagram of an example function for a compartment with fixed adjustments for its walls. The space 503 below the first line indicates a minimum compartment size and the space 505 between the remaining lines indicates the increment size. Products are placed into a compartment until they exceed the size of the minimum compartment size. Then the compartment is increased by a set increment creating a gap in occupied capacity in the vehicle, because the compartment utilizes this space even if a product is not placed into the space, thereby creating scenarios that may waste space. This utilization may be expressed as $f(x)=s_1$ for $x<=s_1$; $f(x)=s_2$ for $s_1<x<=s_2$, etc. where $s_1, s_2 \ldots$ represent the fixed adjustment sizes. FIG. 5(D) is a diagram of an example function similar to the previous example except that the vehicle or compartment has a maximum capacity 501. The compartment in the vehicle may be continually expanded until it reaches a maximum capacity. This utilization may be expressed as $f(x)=s_1$ for $x<=s_1$; $f(x)=s_2$ for $s_1<x<=s_2$, such that $f(x)<=$the upper bound.

FIG. 5(E) is a diagram of an example embodiment where the compartment has a fixed minimum size, but is variably adjustable beyond its minimum size. Products are placed into the compartment, which has a fixed minimum size until the capacity of the minimum sized compartment is exceeded. The compartment is then expanded as it is filled. This utilization may be expressed as $f(x)=s_1$ for $x<=s_1$; $f(x)=x$ for $x>s_1$. FIG. 5(F) is a diagram of an example similar to that of the previous figure except that a maximum capacity of the vehicle or compartment limits the continued addition of products to the compartment to a maximum capacity. This utilization may be expressed as $f(x)=s_1$ for $x<=s_1$; $f(x)=x$ for $s_1<x<$upper bound.

FIG. 5(G) is a diagram of one embodiment of a complex function for a compartment. This complex scenario shows the following function: $f(x)=0$ for $x=0$, $f(x)=2$ for $0<x<=2$, $f(x)=x$ for $2<x<=4$, $f(x)=6$ for $4<x<=6$, $f(x)=x$ for $6<x$. In one embodiment, the function may represent a scenario where the separator for the compartment can be placed such that the vehicle consumption is 0. After a first product is loaded into the compartment, the vehicle consumption is at least 2. This may model a "frozen" compartment in a vehicle that has a side door to load/unload the frozen goods. As soon as the first product is placed into the compartment (e.g. one pizza), the separator must be moved and not obstruct the door such that we can open the door and access the frozen goods. In this example, there may be a second side door. The separator may be placed anywhere between the two doors, but it must not be put in the range covered by the 2nd door. Beyond the second door, the separator may be placed anywhere.

Figure 6:
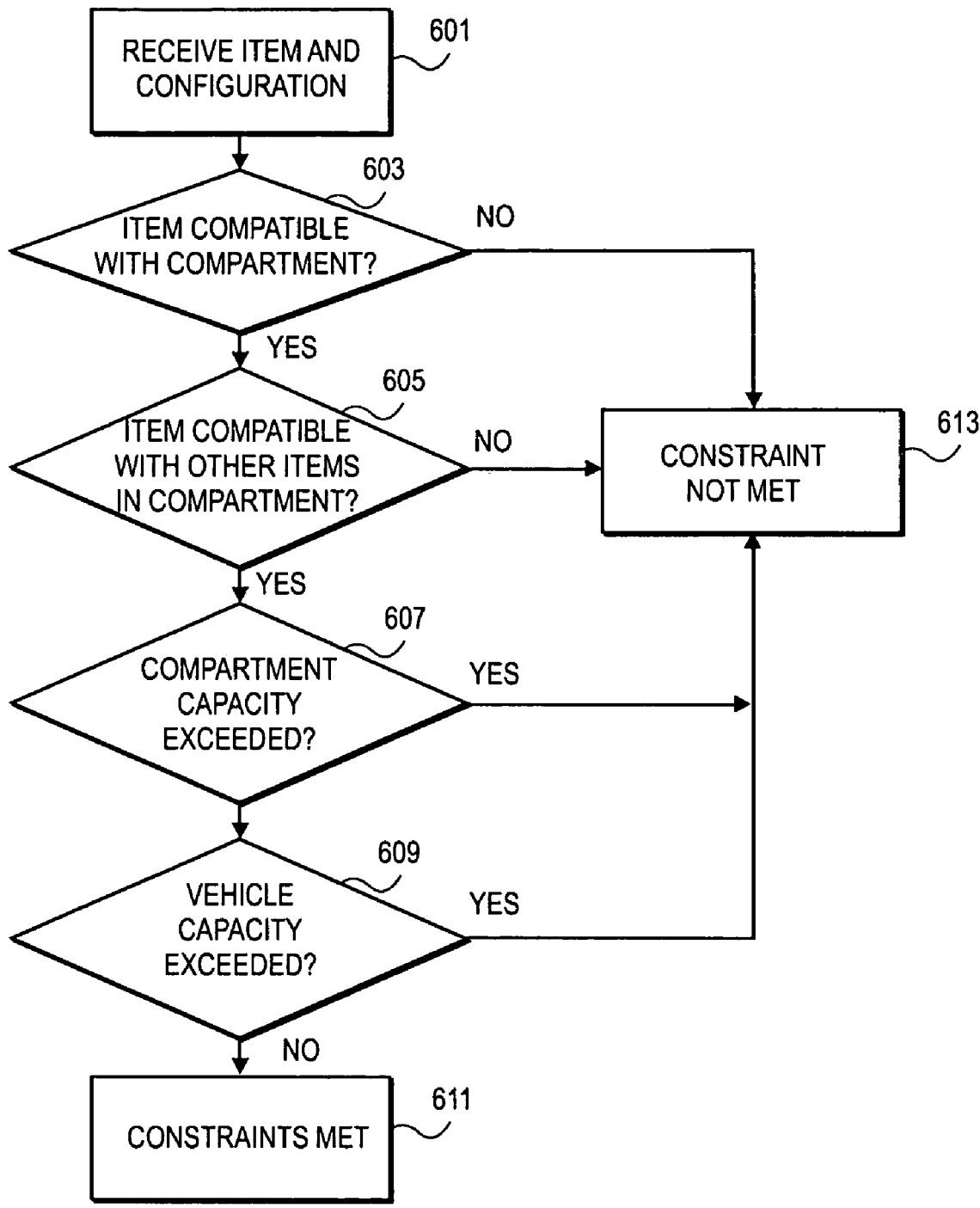
FIG. 6 is a flowchart of one embodiment of a process for constraint checking.

Returning to a discussion of FIG. 3, in one embodiment, after the compartment selection process has completed then a test may be conducted to determine if the compartment meets all of the constraints associated with a product to be placed in the compartment (block 305). FIG. 6 is a flowchart of one example embodiment of a process for determining if constraints on a product being placed in a compartment are met. The example embodiment encompasses a few example constraint checks. One skilled in the art would understand that other constraints may be chained together using basic or complex logic in place of or in combination with the example constraints.

In one embodiment, the constraint checking process may receive a proposed configuration for a compartment with a product derived from a transportation order (block 601). This configuration may include previously placed products within the compartment, the status of the compartment in regard to capacity, the category of the compartment, the category of the product and similar factors.

In one embodiment, the process may check the configuration and product to determine if the product is compatible with the compartment (block 603). A product may need to be in a compartment with specific characteristics or of a certain category. For example, a product may need to be within a defined temperature range and thus within a refrigerator compartment or similar compartment. Other characteristics or categories of a compartment may include airtight, weatherproofed, heated, cushioned or similar characteristics. Similarly, a product may be checked to determine if it is compatible with the vehicle as a whole. Certain categories of products may not be transported on certain categories of vehicles. For example, a frozen pizza may not be transported on a fuel tanker. If the constraint is not met then the process may indicate that the configuration is not feasible (block 613). If the constraint is met then the next constraint may be tested.

In one example embodiment, the configuration and product may be tested to determine if the product is compatible with other products in the compartment (block 605). Certain categories of products may be incompatible with one another. For example, a fuel truck may have multiple airtight compartments (i.e., tanks). A diesel fuel may be loaded into a first tank but not fill it. However, another fuel such as gasoline may not be loaded into the same compartment. Any type of incompatibility may be tested including temperature, mixture, container or similar types of incompatibility. If any other product in the compartment or category of product is not compatible with the product to be placed or the category of product to be placed the process may indicate that the configuration is infeasible (block 613). If no incompatibility is detected then the next constraint may be tested. Similarly, a check may be made to determine if a product or category product to be placed is incompatible with another product or category of product on the vehicle.

In one embodiment, a test may be made to determine if the product placement in the compartment would cause the compartment's capacity to be exceeded (block 607). This check may encompass a check of the weight of the product against the weight limit of the compartment taking into consideration the already placed products, a check of the dimensions of the product or similar tests of the capacity of the compartment. If the compartment does not have sufficient capacity then an indication may be returned that the configuration is not feasible. For example, the load of the compartment may be represented as l(C), which is the total of all transportation orders put in the compartment C. A capacity check of the compartment may be represented as l(C)<=capacity(C). In one embodiment, if the compartment has a variable size then the compartment size may be increased and the compatibility rechecked or the capacity may be increased on a subsequent iteration. If the product does not exceed the capacity then further constraints may be checked.

In one embodiment, a check may be made to determine if the capacity of the vehicle is exceeded by the placement of the product (block 609). A product may cause the overall vehicle capacity factoring in the other products already placed. The product may exceed the vehicle capacity in terms of space, weight or other measurement of capacity. The formula f(x,C) may represent the reduction of the vehicle capacity caused by load x of the compartment C. A check of the vehicle capacity may be $$\sum_C f(l(C), C) \le \text{capacity } (V),$$

where V represents the vehicle. Each compartment could have a different function f(x,C) and each compartment may have a different function per loading dimension. For example, if a vehicle has m compartments and n dimensions total, then the vehicle may be represented by m*n functions. If the capacity is exceeded then the process may return an indication that the constraints have not been met and the configuration is infeasible. If the capacity is not exceeded and all constraints have been met then the process may return an indication that the configuration is feasible (block 611).

Returning to the discussion of FIG. 3, the scheduling process receives the indication from the constraint checking process and records that the configuration is feasible (block 307) or proceeds toward a path that will check the next configuration. If the constraint is not met, a check may be made to determine if the last compartment on the vehicle has been checked (block 313). If further compartments are present then the next compartment is selected and the process continues to check the next configuration. Similarly, the next configuration may be to check the same compartment with changed characteristics such as increasing the capacity by adjusting the walls of the compartment if it is a variable sized or fixed increment adjustable compartment.

If the end of the vehicle, the last compartment or the last permutation of the compartment characteristics has been tested then the process determines that the product placement on the vehicle is not feasible (block 315). The transportation determination module may receive this indication and generate a new set of transportation orders or configurations to be tested that exclude the assignment that lead to the determination of infeasibility by the compartment determination module.

If the constraints are met the configuration may be labeled or marked as feasible (block 307). This indication may be used to identify configurations or partial configurations that are workable and may be used or compared to one another to find an optimal scheduling. In one embodiment, in addition to or in place of marking a configuration or transportation order as feasible the compartment determination module may generate a score for the configuration or transportation order. The score may indicate the utilization of the capacity of a compartment or vehicle. The score may be used to select the best configuration from amongst a set of feasible configurations.

The configuration may be stored for future use or modification in the next iteration (block 309). The process may continue and check to determine if additional products are to be added to the current configuration (block 311). If further products are to be added then the next item may be received or selected (block 301) and the process continues to iterate until it is determined to be infeasible (block 315) or all the products are placed in the configuration and the complete configuration is stored or returned (block 317). This process may be used to evaluate multiple configurations serving as a filter for proposed configurations that are not compatible with the compartment configuration of the vehicle or set of vehicles.

In the example process described above a 'greedy' algorithm is employed to assign products to the first available space. In other embodiments, local searches or similar processes may be used to assign the products to the compartments and vehicles. The configuration of products may be redistributed with each added product or after all products have been assigned using a search function to optimize the utilization of capacity and increase the likelihood of finding a feasible solution. In one embodiment, a user, administrator or similar entity may select a heuristic for the search and optimization program.

Figure 7:
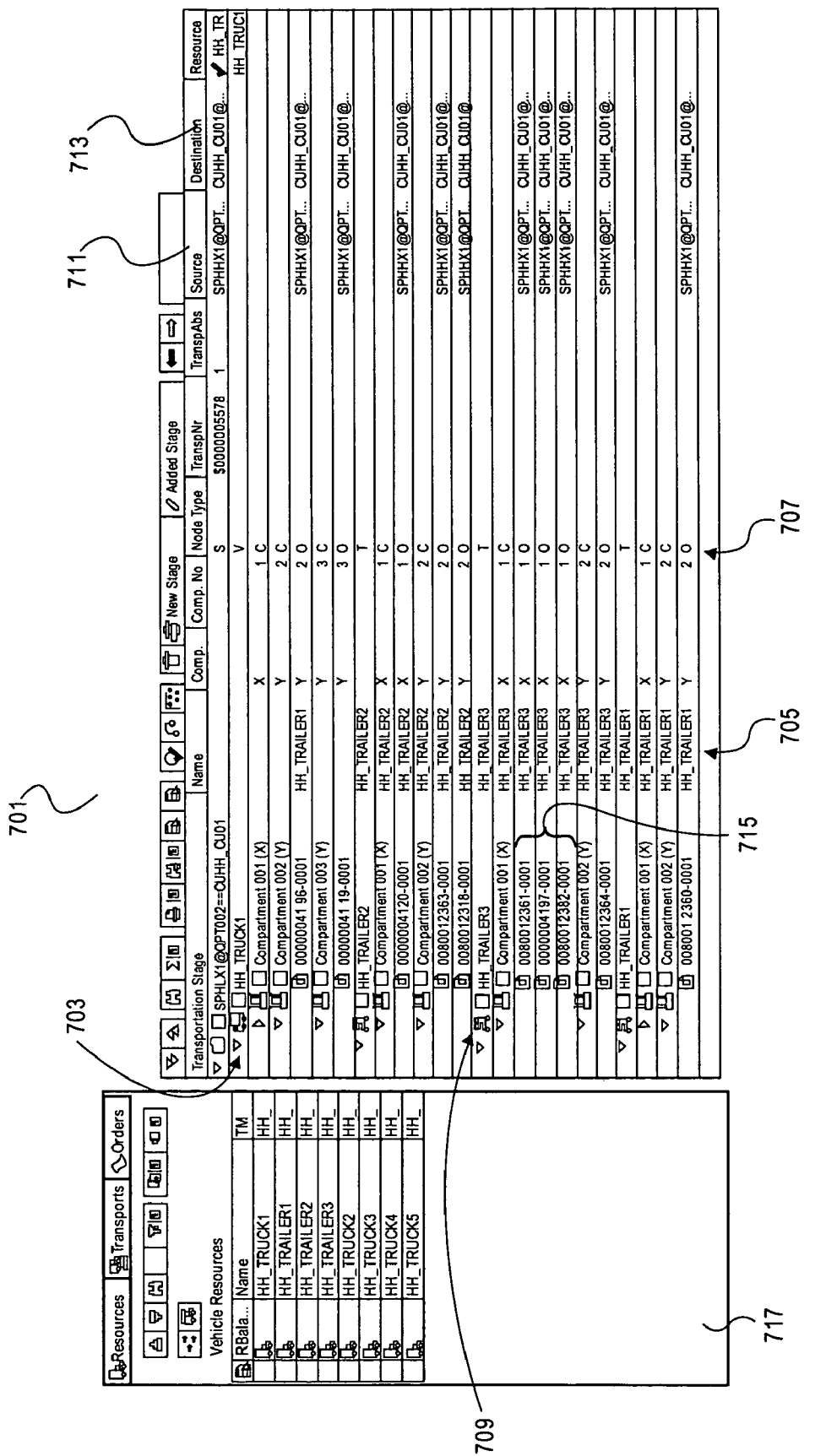
FIG. 7 is a diagram of one embodiment of a user interface for the scheduling system.

FIG. 7 is a diagram of one embodiment of a user interface for the vehicle scheduling system. The user interface may be used to monitor the scheduling process, view the results of the process, adjust the settings of the process, rescheduling products or transportation orders and similar functions.

The user interface 701 may include a listing of vehicles 717. The listing may also include trailers or sub-sections of the vehicles. For example, with a train each box car may be listed. The user interface may also include a display of transportation orders organized by vehicles, sub-sections and compartments. The vehicles, sub-sections and compartments may be organized in a hierarchy. The hierarchy may be shown as a set of nested items. For example a truck 703 may be shown in the display. Information about the truck may be provided including the source location 711 and the destination location 713. Each trailer 709 and compartment associated with a truck may be listed. Each trailer and compartment may have an assigned name 705 and type 707 displayed. Other information may be displayed including the category, source 711, destination 713 and similar information.

In one embodiment, transportation orders 715 may be grouped under each assigned compartment. Transportation order information may also be displayed including the category, type 707, name 705, source 711, destination 713 and similar information about the order.

The data may be sorted, rearranged or similarly manipulated. The user interface may also provide menus for setting the configuration of the transportation determination module and processes as well as the compartment determination module and processes. Transportation orders, compartments, sub-sections and vehicles may be rearranged and regrouped by dragging and dropping or similar interface mechanism.

In one embodiment, the scheduling system including the compartment determination module may be implemented as hardware devices. In another embodiment, these components may be implemented in software (e.g., microcode, assembly language or higher level languages). These software implementations may be stored on a machine-readable medium. A "machine readable" medium may include any medium that can store or transfer information. Examples of a machine readable medium include a ROM, a floppy diskette, a CD-ROM, a DVD, flash memory, hard drive, an optical disk or similar medium.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   receiving a transportation order indicating an item to be transported;
   determining a first configuration with the item in a first compartment of a first vehicle having a plurality of separate compartments, each compartment having an associated capacity value;
   generating, in a computer, an indicator of feasibility for the first configuration based on whether the first configuration meets a first set of transportation constraints;
   adjusting, in the computer, the capacity value for the first compartment if the first configuration is not feasible; and
   determining, in the computer, if the first configuration is feasible with the capacity value of the first compartment adjusted.

2. The method of claim 1, further comprising:
   storing the first configuration in a compartment configuration data structure for the first vehicle.

3. The method of 1, further comprising:
   determining a second configuration with the item in a second compartment of the first vehicle if the first configuration is not feasible.

4. The method of 1, further comprising:
   performing a local search to optimize a placement of the item in at least one of the plurality of compartments of the first vehicle.

5. The method of claim 1, further comprising:
   serializing a set of transportation orders to determine feasibility of a transportation plan based on whether the set of transportation orders can be distributed across a plurality of compartments of a vehicle.

6. The method of claim 5, wherein the set of transportation orders are serialized in an order based on a predetermined characteristic of the set of transportation orders.

7. The method of claim 1, further comprising:
   checking a capacity of the first compartment of the first vehicle.

8. The method of claim 1, further comprising:
   determining compatibility of the item with the first compartment.

9. The method of claim 1, further comprising:
   determining compatibility of a first set of items with a second set of items in the first compartment.

10. The method of claim 1, further comprising:
    determining compatibility of a first item with a second item in the first compartment.

11. The method of claim 1, further comprising:
    displaying a set of transportation orders organized by vehicle and compartment.

12. The method of claim 1, further comprising:
    verifying that the first configuration does not exceed a capacity of a vehicle.

13. The method of claim 1, further comprising:
    verifying that the first configuration does not exceed the capacity of a compartment.

14. The method of claim 1, further comprising:
    verifying that transportation orders assigned to the first compartment do not exceed a capacity of the first vehicle.

15. The method of claim 1, further comprising:
    verifying that transportation orders assigned to the first vehicle do not exceed vehicle capacity.

16. The method of claim 1, further comprising:
    determining a relationship between vehicle capacity usage and number of items placed in the vehicle using a function representing compartment storage characteristics.

17. A system comprising:
    a demand order generating module, to generate a set of demand orders;
    a transportation determination module to receive the set of demand orders and generate a set of transportation orders; and
    a compartment determination module to receive a transportation order and generate an indication of feasibility based on compatibility of an assignment of the transportation order to a compartment of a vehicle, wherein the compartment determination module operates transparently to the transportation determination module.

18. The system of claim 17, further comprising:
    a user interface module to display vehicle, compartment and transportation order arrangement.

19. The system of 17, further comprising:
    a storage device to store a compartment configuration data structure of a vehicle with assignments of orders to compartments.

20. The system of claim 17, further comprising:
    a serialization module to prepare a set of transportation orders for compartmentalization analysis.

21. The system of claim 17, wherein the set of transportation orders are serialized in an order based on a predetermined characteristic of the set of transportation orders.

22. A non-transitory machine readable medium having a set of instructions stored therein which when executed cause a machine to perform a set of operations comprising:
    receiving a set of transportation orders;
    iterating through permutations of the transportation orders distributed across compartments of a set of vehicles;
    identifying configurations that meet a set of predetermined constraints related to the compartments and transportation orders; and
    generating instructions for sizing the compartments and loading the set of vehicles based on a selected configuration that meets the set of predetermined instructions.

23. The machine readable medium of claim 22, having a further set of instructions stored therein which when executed cause a machine to perform a set of operations further comprising:
    generating a configuration of the set of transportation orders distributed across compartments of the set of vehicles.

24. The machine readable medium of claim 22, having a further set of instructions stored therein which when executed cause a machine to perform a set of operations further comprising:

displaying the set of transportation orders organized by vehicle and compartment.

25. An apparatus comprising:

means for receiving a set of transportation orders;

means for iterating through permutations of the transportation orders distributed across compartments of a set of vehicles; and means for adjusting compartment capacity values during iteration through the permutations;

means for identifying configurations that meet a set of predetermined criteria related to the compartments.

26. The apparatus of claim 25, further comprising:

means for generating a configuration of the set of transportation orders distributed across compartments of the set of vehicles.

27. The apparatus of claim 25, further comprising:

means for displaying the set of transportation orders organized by vehicle and compartment.

28. The apparatus of claim 25, further comprising:

means for performing any one of local search, tabu search, simulated annealing, evolutionary algorithms, mixed integer programming or constraint programming to optimize a placement of a set of items from a transportation order across compartments of a vehicle during each iteration.

29. The machine readable medium of claim 22, having a further set of instructions stored therein which when executed cause a machine to perform a set of operations further comprising:

performing any one of local search, tabu search, simulated annealing, evolutionary algorithms, mixed integer programming or constraint programming to optimize a placement of a set of items from a transportation order across compartments of a vehicle during each iteration.

30. A system comprising:

a demand order generating module to generate a set of demand orders;

a transportation determination module to receive the set of demand orders and generate a set of transportation orders, each of the transportation orders are generated based on a local search which optimizes a placement of a first item in at least one of a plurality of compartments, the transportation determination module determines compatibility of the first item with a second item in the first compartment;

a compartment determination module to receive a transportation order and to generate an indication of feasibility based on compatibility of an assignment of the transportation order to a compartment of a vehicle;

a user interface module to display a set of transportation orders organized by vehicle and compartment; and a serialization module to prepare a set of transportation orders prior to determining feasibility of a transportation plan based on whether the set of transportation orders can be distributed across a plurality of compartments of a vehicle.

* * * * *